United States Patent

Corcoran et al.

Patent Number: 5,279,862
Date of Patent: Jan. 18, 1994

[54] PROCESS FOR REFINISHING CLEAR COAT/COLOR COAT FINISH

[75] Inventors: Patrick H. Corcoran, Cherry Hill; Gary W. Nickel, Sewell, both of N.J.

[73] Assignee: E. I. Du Pont de Nemours and Company, Wilmington, Del.

[21] Appl. No.: 940,781

[22] Filed: Sep. 4, 1992

Related U.S. Application Data

[63] Continuation-in-part of Ser. No. 780,062, Oct. 21, 1991, abandoned.

[51] Int. Cl.⁵ .......................... B05D 1/36; B05D 7/00
[52] U.S. Cl. ................. 427/407.1; 427/409; 427/412.1; 427/142
[58] Field of Search .................. 427/407.1, 409, 412.1, 427/142

[56] References Cited

U.S. PATENT DOCUMENTS

| | | | |
|---|---|---|---|
| 3,639,147 | 2/1972 | Benefiel et al. | 117/73 |
| 4,246,368 | 1/1981 | Murase | 525/117 |
| 4,281,078 | 7/1981 | Strolle et al. | 524/315 |
| 4,710,543 | 12/1987 | Chattha et al. | 525/161 |
| 4,713,265 | 12/1987 | Nahas et al. | 427/385.5 |
| 4,728,543 | 3/1988 | Kurguchi et al. | 427/407.1 |
| 4,808,656 | 2/1989 | Kania et al. | 524/512 |
| 4,999,213 | 3/1991 | Meyer | 427/426 |

*Primary Examiner*—Anthony McFarlane
*Assistant Examiner*—Nhat D. Phan
*Attorney, Agent, or Firm*—Hilmar L. Fricke

[57] ABSTRACT

A improved process for applying a clear coat/color coat composition to a substrate in which a color coat is applied to a substrate and then a clear coat is applied over the color coat; the improvement used therewith is a clear coating composition having a film forming binder solids content of about 30–70% by weight and an organic liquid carrier, wherein the binder contains about (A) 50–80% by weight, based on the weight of the binder, of an acrylic polymer of polymerized monomers of styrene, a methacrylate monomer from the group of methyl methacrylate, isobornyl methacrylate, cyclohexyl methacrylate or any mixtures thereof, a second methacrylate monomer from the group of n-butyl methacrylate, isobutyl methacrylate or ethyl hexyl methacrylate or any mixtures thereof and a hydroxy alkyl methacrylate or acrylate each having 1–4 carbon atoms in the alkyl group, where the polymer has a number average molecular weight of about 5,000–20,000 determined by gel permeation chromatography and a calculated Tg of at least 40° C. and correspondingly, (B) 20–50% by weight, based on the weight of the binder, of an organic polyisocyanate;

wherein the clear coating composition on curing is in a tack free state within 3 hours after application and has a Persoz hardness of at least 30 counts.

8 Claims, No Drawings

PROCESS FOR REFINISHING CLEAR COAT/COLOR COAT FINISH

CROSS REFERENCE TO RELATED APPLICATIONS

This application is a continuation-in-part application of Ser. No. 07/780,062 filed Oct. 21, 1991, now abandoned.

BACKGROUND OF THE INVENTION

This invention is directed to an improved process for refinishing clear coat/color coat finish of a vehicle such as an automobile or a truck.

Clear coat/color coat finishes for automobiles and trucks have been used in recent years and are very popular. Kurauchi et al U.S. Pat. No. 4,728,543 issued Mar. 1, 1988 and Benefiel et al U.S. Pat. No. 3,639,147 issued Feb. 1, 1972 show the application of a clear coat to a color coat or basecoat in a "wet on wet" application, i.e., the clear coat is applied before the color coat is completely cured.

Repair of these clear coat/color coat finishes has been difficult in that the conventional refinish clear coating in current use does not dry to a tack free state in relatively short period of time and the vehicle cannot be moved with out having dust and dirt stick to the clear coat nor can the clear coat be buffed until completely dried to form a finish with acceptable gloss and smoothness. In a typical refinish operation, after the color coat is applied, the clear coat is applied to the vehicle and the resulting finish is allowed to dry before the vehicle is moved. Before any further work can be done to the finish, it must be tack free so that dust and dirt will not stick to the finish and must be sufficiently hard to buff to improve gloss or remove minor imperfections. Conventional finishes have long drying and curing times and therefore, reduce the productivity of a refinish operation since the vehicles can not be moved and worked on quickly after application of the finish.

The improved process of this invention uses a clear coating composition that dries in a relatively short period of time to a hard and glossy finish which allows the vehicle to be moved and the finish can be buffed if necessary to remove minor imperfections and enhance gloss and improves the efficiency of a refinish operation by allowing more vehicles to be processed in the same or in less time.

SUMMARY OF THE INVENTION

An improved process for applying a clear coat/color coat composition to a substrate in which a color coat is applied to a substrate and then a clear coat is applied over the color coat; the improvement used therewith is a clear coating composition having a film forming binder solids content of about 30-70% by weight and an organic liquid carrier, wherein the binder contains about (A) 50-80% by weight, based on the weight of the binder, of an acrylic polymer of polymerized monomers of styrene, a methacrylate monomer from the group of methyl methacrylate, isobornyl methacrylate, cyclohexyl methacrylate or any mixtures thereof, a second methacrylate monomer from the group of n-butyl methacrylate, isobutyl methacrylate or ethyl hexyl methacrylate and a hydroxy alkyl methacrylate or acrylate each having 1-4 carbon atoms in the alkyl group, where the polymer has a number average molecular weight of about 2,000-12,000 determined by gel permeation chromatography and a calculated Tg of at least 40° C. and correspondingly, (B) 20-50% by weight, based on the weight of the binder, of an organic polyisocyanate;

wherein the clear coating composition on curing is in a tack free state within 3 hours after application and has a Persoz hardness of at least 30 counts.

The clear coating composition also is a part of this invention.

DESCRIPTION OF THE INVENTION

In the repair of a clear coat/color coat finish of an automobile or a truck, generally the color coat is applied and dried for a short period of time but not cured and then the clear coat is applied and both are cured. If necessary the clear coat can be buffed to improve appearance and remove minor imperfections. To improve the rate of processing vehicles through an repair shop, a short drying time for the finish is desired. In particular, a short tack and dust free time is needed for the clear finish so that the vehicle can be moved out of the work area so that another vehicle can be painted. The clear finish should be buffable in a short period of time and remain buffable for several days and up to a week before it cures to tough hard durable finish. For a finish to be buffable it must be hard but not tough.

The clear coat used in the process of this invention is solvent based and has a binder solids content of about 30-70% by weight. The binder contains about 50-80% by weight of an acrylic polymer and correspondingly about 20-50% by weight of an organic polyisocyanate.

The acrylic polymer used in the clear coating composition is prepared by conventional solution polymerization techniques in which monomers, solvents and polymerization catalyst are charged into a conventional polymerization reactor and heated to about 60°-150° C. for about 0.5-6 hours to form a polymer having number average molecular weight of about 2,000-12,000, preferably 5,000-10,000 and a weight average molecular weight of about 5,000-25,000.

Molecular weight is determined by gel permeation chromatography using polymethyl methacrylate as the standard.

The acrylic polymer has a calculated glass transition temperature of at least 40° C. and preferably 60°-80° C. The glass transition temperature is calculated by the equation:

$$\frac{1}{TGC} = \sum_i \frac{W_i}{TGH_i}$$

where

TGC—is the glass transition temperature of the polymer in degrees Kelvin;

$W_i$—is the weight fraction of monomer i in the polymer;

$TGH_i$—is the glass transition temperature of of the homopolymer in degrees Kelvin of monomer i which can be found for example in a source book such as the *Polymer Handbook* by J. Brandrup and E. H. Immergut and published by John Wiley & Sons.

The above equation is discussed on page 29 in *The Chemistry of Organic Film Formers*, 2nd edition, by D. H. Solomon and published by Robert E. Krieger Publishing Co.

The glass transition temperature also can be measured by differential scanning calorimetry.

Typically useful polymerization catalysts are azo type catalysts such as azo-bis-isobutyronitrile, 1,1'-azobis(cyanocyclohexane), acetates such as t-butyl peracetate, peroxides such as di-t-butyl peroxide, benzoates such as t-butyl perbenzoate, octoates such as t-butyl peroctoate and the like.

Typical solvents that can be used are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, ester, acetates and mixtures of any of the above.

The acrylic polymer is composed of polymerized monomers of styrene, a methacrylate which is either methyl methacrylate, isobornyl methacrylate, cyclohexyl methacrylate or a mixture of these monomers, a second methacrylate monomer which is either n-butyl methacrylate, isobutyl methacrylate or ethyl hexyl methacrylate or a mixture of these monomers and a hydroxy alkyl methacrylate or acrylate that has 1-4 carbon atoms in the alkyl group such as hydroxy ethyl methacrylate, hydroxy propyl methacrylate, hydroxy butyl methacrylate, hydroxy ethyl acrylate, hydroxy propyl acrylate, hydroxy butyl acrylate and the like.

One preferred acrylic polymer contains about 5-20% by weight styrene, 10-30% by weight of the methacrylate, 30-60% by weight of the second methacrylate and 10-30% by weight of the hydroxy alkyl methacrylate. The total percentage of monomers in the polymer equal 100%.

One particularly preferred acrylic polymer contains the following constituents in the above percentage ranges: styrene, methyl methacrylate, isobutyl methacrylate and hydroxy ethyl methacrylate.

Optionally, the polymer can contain about 0.5-2% by weight of acrylamide or methacrylamide such as n-tertiary butyl acrylamide or methacrylamide.

The clear coating composition also contains an organic polyisocyanate crosslinking agent. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of diisocyanates also can be used such as the trimer of hexamethylene diisocyanate which is sold under the tradename "Desmodur" N-3390.

Isocyanate functional adducts can be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidene diisocyanate and trimethylol propane and is sold under the tradename "Cythane" 3160.

To improve weatherability of the clear composition about 0.1-10% by weight, based on the weight of the binder, of ultraviolet light stabilizers screeners, quenchers and antioxidants can be added. Typical ultraviolet light screeners and stabilizers include the following:

Benzophenones such as hydroxy dodecycloxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxyphenyl derivatives of triazine, sulfur containing derivatives of dialkyl-4-hydroxy phenyl triazine, hydroxy phenyl- 1,3,5-triazine and the like.

Triazoles such as 2-phenyl-4-(2,2'-dihydroxy benzoyl)-triazole, substituted benzotriazoles such as hydroxy-phenyltriazole and the like.

Hindered amines such as bis(1,2,2,6,6 entamethyl-4-piperidinyl sebacate), di[4(2,2,6,6,tetramethyl piperidinyl)]sebacate and the like and any mixtures of any of the above.

The clear coating composition contains a sufficient amount of a catalyst to cure the composition at ambient temperatures. Generally, about 0.01-2% by weight, based on the weight of the binder, of catalyst is used. Typically useful catalysts are triethylene diamine and alkyl tin laurates such a dibutyl tin dilaurate, tertiary amines, aluminum halides, lithium halide complexes, substituted imidazole thiones and the like. Preferred is a mixture of triethylene diamine and dibutyl tin dilaurate.

Generally, flow control agents are used in the composition in amounts of about 0.1-5% by weight, based on the weight of the binder, such as polyacrylic acid, polyalkylacrylates, polyether modified dimethyl polsiloxane copolymer and polyester modified polydimethyl siloxane.

It may be desirable to use pigments in the clear coating composition which have the same refractive index as the dried coating. Typically, useful pigments have a particle size of about 0.015-50 microns and are used in a pigment to binder weight ratio of about 1:100 to 10:100 and are inorganic siliceous pigments such as silica pigment having a refractive index of about 1.4-1.6.

In applying the clear coating composition to a vehicle such as an automobile or a truck for a repair or repainting, the basecoat which may be either a solvent based composition or a waterborne composition is first applied and then dried to at least remove solvent or water before the clear coat is applied usually by conventional spraying. Electrostatic spraying also may be used. The dry film thickness of the clear coating is about 0.5-5 mils. The clear coat is dried at ambient temperatures but moderately higher temperatures up to about 40° C. can be used. As soon as the clear finish is dust free and tack free the vehicle can be moved from the work area to allow for the refinishing of another vehicle.

Generally, within about 3 hours after application, the clear coat is sufficiently cured to allow for buffing and polishing if needed to remove imperfections and improve gloss of the finish. The clear coat cures to a Persoz hardness of at least 30 counts before it can be buffed. The clear coat can cure to a Persoz hardness of up to 350 counts but preferably in the range of about 40-100 counts to form an excellent quality film that can be buffed. The clear coat continues to cure and after 7-10 days reaches a relatively high level of hardness and toughness that is required for a durable and weatherable automotive finish.

Persoz hardness is determined by a GARDCO® Pendulum Hardness Tester model HA-5854 manufactured by BYK Chemie, Germany and sold by Paul N. Gardner Company, Inc. Pompano Beach, Fla. The tester has a digital counter and an LED indicator.

The process of this invention can be used to paint or repair a variety of substrates such as previously painted metal substrates, cold roll steel, steel coated with conventional primers such as electrodeposition primers, alkyd resin repair primers and the like, plastic type substrates such as polyester reinforced fiber glass, reaction injection molded urethanes and partially crystalline polyamides.

The following examples illustrate the invention. All parts and percentages are on a weight basis unless otherwise indicated. Molecular weights are determined by gel permeation chromatography.

EXAMPLE

An acrylic polymer solution was prepared by charging the following constituents into a polymerization reactor equipped with a thermometer, a heating source, stirrer, thermometer, dropping funnel, nitrogen purge and a condenser:

|  | PARTS BY WEIGHT |
| --- | --- |
| Portion 1 |  |
| Xylene | 56.67 |
| Portion 2 |  |
| Styrene monomer | 15.00 |
| Methyl methacrylate monomer | 20.00 |
| Isobutyl methacrylate monomer | 45.00 |
| Hydroxy ethyl methacrylate monomer | 20.00 |
| T-butyl peracetate solution (75% solids in mineral spirits) | 2.40 |
| Portion 3 |  |
| Methyl ethyl ketone | 10.00 |
| T-butyl peracetate solution (75% solids in mineral spirits) | 0.60 |
| Total | 169.67 |

Portion 1 was added to the reactor and heated to its reflux temperature. Portion 2 was premixed and then added at a uniform rate to the reactor over a three hour period while the resulting reaction mixture was maintained at its reflux temperature. Portion 3 was added to the reactor over a one hour period at a uniform rate while maintaining the reaction mixture at its reflux temperature. The reaction mixture was held at its reflux temperature for an additional hour.

The resulting acrylic polymer solution had a polymer solids content of about 58%. The polymer had a number average molecular weight of about 6231 and a weight average molecular weight of about 12,023 determined by gel permeation chromatography using polystyrene as the standard. The glass transition temperature was calculated as 70° C. using the aforementioned equation.

A coating composition was prepared by forming components 1 and 2 and then mixing these two components together. The following ingredients were blended together to form component 1:

| COMPONENT 1 |  |
| --- | --- |
|  | PARTS BY WEIGHT |
| Acrylic polymer solution (prepared above) | 58.09 |
| Tinuvin ® 292 (1,2,2,6,6-pentamethyl-4-piperidenyl)sebacate | 0.68 |
| Tinubin ® 328 (2-(2-hydroxy-3,5-ditertiary amyl phenol)-2H-benzotriazole) | 0.68 |
| Triethylene cliamine | 0.06 |
| Byk 306 (12% solids in xylene/monophenyl glycol of polyether modified dimethyl polysiloxane copolymer) | 0.59 |
| Dibutyl tin dilaurate | 0.01 |
| Butyl acetate | 1.43 |
| Methyl ethyl ketone | 8.66 |
| Toluene | 18.23 |
| Xylene | 4.71 |
| Methyl isobutyl ketone | 6.60 |
| Ethyl acetate | 0.26 |
| Total | 100.00 |

| COMPONENT 2 The following ingredients were blended together to form component 2 which is an activator solution: | |
| --- | --- |
|  | PARTS BY WEIGHT |
| Desmodur ® 3390[1] | 43.34 |
| Toluene | 27.29 |
| Butyl acetate | 29.37 |
| Total | 100.00 |

[1]Desmodur ® 3390 - 1,6-hexamethylene diisocyanate based adduct; 90% solids solution in PM acetate and hydrocarbon solvent 1/1 ratio from Mobay.

Components 1 and 2 were mixed together in a 4 to a 1 volume ratio to form a coating composition which was sprayed onto a metal substrate coated with a primer and a base coat. The clear coating dried to a tack free state in 3 hours and had a Persoz hardness of 50 and was buffed in 4 hours to form a smooth glossy finish.

A conventional commercially available refinish clear coating composition was prepared. The composition contained a commerical acrylic polyol that was activated with an isocyanate activator based on hexamethylene diisocyanate and a mid-temperature reducer solvent was added to provide the correct spray viscosity and spray solids. The resulting composition was sprayed onto steel substrate that has the same primer coat and a base coat as above and sprayed under the same conditions as above and dried as above.

The following is a comparison of important properties of the composition of this invention and the conventional refinish composition:

|  | Composition of Invention | Conventional Refinish Composition |
| --- | --- | --- |
| Dust free time | 4 minutes | 15 minutes |
| Zapon tack dry | 3 hours | 5.5 hours |
| Time to buff | 4 hrs–1 week | 12–48 hours |
| Ease of buffing | Excellent | Poor |
| Tukon Hardness |  |  |
| 24 hours | 2.8 | 1.9 |
| 48 hours | 5.1 | 5.7 |
| 1 week | 7.7 | 8.9 |
| 1 month | 8.9 | 9.4 |
| Persoz Hardness |  |  |
| 24 hours | 108 | 88 |
| 48 hours | 144 | 100 |
| 1 week | 179 | 115 |
| 1 month | 229 | 135 |

-continued

|  | Composition of Invention | Conventional Refinish Composition |
|---|---|---|
| Glass transition temperature determined by DMA (DuPont Dynamic Mechanical Analyzer Model 983) | | |
| 4 hours | 18° C. | 12° C. |
| 24 hours | 40° C. | 25° C. |
| 48 hours | 45° C. | 87° C. |
| 1 month | 58° C. | 62° C. |
| Tensile Properties (determined by Instron Tensile Tester Model 1122) | | |
| Modulus | 1165 MPA | 979 MPA |
| Break energy | 33.4 MJ | 44.0 MJ |
| Break strain | 6.1% | 8.8% |
| Toughness | 37.6 MJ/MM2 | 52.1 MJ/MM2 |

The composition of the invention was dust free in 4 minutes versus the conventional composition which was dust free in 15 minutes. The composition of the invention can be sprayed with less flash time between coats and will be resistant to dust and dirt contamination much sooner than the conventional composition. The tack dry time for the invention was 3 hours versus 5.5 hours for the conventional finish which means that masking tape and protective paper can be removed earlier and the car can be reassembled and delivered sooner. Buffing time of 4 hours for the invention versus 12 hours for the conventional composition indicated that dirt can be buffed away or the appearance of the finish can be improved by buffing within the same day instead of the next day with the conventional composition which obviously increases the productivity of a refinish shop. The composition of the invention developed hardness rapidly but increased in toughness over a longer period of time which allowed the finish to be in a buffable condition for a longer period to remove imperfections and improve smoothness and gloss.

We claim:

1. An improved process for applying a clear coat/color coat composition to a substrate comprising the steps of applying a color coat to a substrate, applying a clear coat over the color coat, and curing the clear coat and color coat at ambient temperatures to form a cured clear coat/color coat finish; the improvement comprises using therewith a clear coating composition having a film forming binder solids content of about 30-70% by weight and an organic liquid carrier, wherein the binder contains about (A) 50-80% by weight, based on the weight of the binder, of an acrylic polymer consisting essentially of polymerized monomers of styrene; a methacrylate monomer selected from the group consisting of methyl methacrylate, isobornyl methacrylate, cyclohexyl methacrylate, or any mixtures thereof; a second methacrylate monomer selected from the group consisting of n-butyl methacrylate, isobutyl methacrylate, or any mixtures thereof; and a hydroxyl alkyl methacrylate or hydroxy alkyl acrylate, each having 1-4 carbon atoms in the alkyl group; wherein the acrylic polymer has a number average molecular weight of about 2,000-12,000 determined by gel permeation chromotography and a calculated $T_g$ of at least 40° C., and (B) 20-50% by weight, based on the weight of the binder, of an organic polyisocyanate;

wherein the clear coating composition cures to a tack free state within 3 hours of application and to a Persoz hardness of at least 30 counts.

2. The process of claim 1 in which the acrylic polymer consists essentially of polymerized monomers of styrene, methyl methacrylate, isobutyl methacrylate and hydroxy ethyl methacrylate.

3. The process of claim 1 in which the acrylic polymer consists essentially of polymerized monomers of styrene, methyl methacrylate, n-butyl methacrylate and hydroxy ethyl methylacrylate.

4. The process of claim 2 in which the acrylic polymer consists essentially of polymerized monomers of 5-20% by weight, based on the weight of the polymer, of styrene, 10-30% by weight of methyl methacrylate, 30-60% by weight of isobutyl methacrylate and 10-30% by weight hydroxy ethyl methacrylate where the total percentage of the monomer equals 100%.

5. The process of claim 2 in which the organic polyisocyanate is an aliphatic or cycloaliphatic polyisocyanate.

6. The process of claim 5 in which the organic polyisocyanate is the trimer of hexamethylene diisocyanate.

7. The process of claim 1 in which the composition contains about 0.01-2% by weight of the binder, of a catalyst of triethylene diamine and an alkyl tin laurate.

8. The process of claim 1 in which the clear composition contains about 0.1-10% by weight of ultraviolet light absorbers and antioxidants.

* * * * *